(12) United States Patent
Zhang et al.

(10) Patent No.: US 9,531,483 B2
(45) Date of Patent: Dec. 27, 2016

(54) DEVICES AND METHODS FOR FACILITATING SIGNAL-TO-INTERFERENCE RATIO ESTIMATES FOR CLOSED-LOOP TRANSMISSION DIVERSITY COMMUNICATIONS

(71) Applicant: QUALCOMM Incorporated, San Diego, CA (US)

(72) Inventors: Wei Zhang, Santa Clara, CA (US); Guang Xie, San Jose, CA (US); Nate Chizgi, Sunnyvale, CA (US); Prashant Udupa Sripathi, Santa Clara, CA (US); Todd Nicholas Tsakiris, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 14/100,875

(22) Filed: Dec. 9, 2013

(65) Prior Publication Data
US 2014/0378069 A1 Dec. 25, 2014

Related U.S. Application Data

(60) Provisional application No. 61/836,824, filed on Jun. 19, 2013.

(51) Int. Cl.
*H04B 17/00* (2015.01)
*H04B 17/309* (2015.01)
(Continued)

(52) U.S. Cl.
CPC ........ *H04B 17/0025* (2013.01); *H04B 7/0634* (2013.01); *H04B 17/18* (2015.01); *H04B 17/336* (2015.01)

(58) Field of Classification Search
USPC ............... 455/67.11, 69, 101, 103, 124, 125
See application file for complete search history.

(56) References Cited

U.S. PATENT DOCUMENTS 6,069,912 A 5/2000 Sawahashi et al.
6,980,612 B1 12/2005 Miyoshi
(Continued)

FOREIGN PATENT DOCUMENTS

EP 1748579 A1 1/2007

OTHER PUBLICATIONS

International Search Report and Written Opinion—PCT/US2014/041851—ISA/EPO—Nov. 28, 2014.
(Continued)

*Primary Examiner* — Blane Jackson
(74) *Attorney, Agent, or Firm* — Loza & Loza LLP

(57) ABSTRACT

UEs are adapted to facilitate calculation of signal-to-interference ratio (SIR) estimates in closed-loop transmission diversity (CLTD) communications before downlink and uplink synchronization is achieved. A UE may receive a transmission sent using transmission diversity. According to one example, the UE may calculate a plurality of signal-to-interference ratio (SIR) estimates for the received transmission, where each signal-to-interference ratio estimate is calculated using a different weight factor. The UE may further select one of the calculated signal-to-interference ratio (SIR) estimates to be employed for the received transmission. According to another example, the UE may calculate a signal-to-interference ratio (SIR) estimate for the received transmission without employing any weight factor. Other aspects, embodiments, and features are also included.

22 Claims, 7 Drawing Sheets

(51) Int. Cl.
*H04B 7/02* (2006.01)
*H04B 7/06* (2006.01)
*H04B 17/18* (2015.01)
*H04B 17/336* (2015.01)

(56) References Cited

U.S. PATENT DOCUMENTS

| | | | |
|---|---|---|---|
| 7,649,967 B2 | 1/2010 | Jonsson | |
| 8,340,139 B2* | 12/2012 | Kent | H04B 7/0857 370/536 |
| 2007/0280147 A1* | 12/2007 | Catreux-Erceg | H04B 17/336 370/318 |
| 2009/0227208 A1* | 9/2009 | Shinoda et al. | 455/67.11 |
| 2011/0002237 A1 | 1/2011 | Nakayama | |
| 2011/0149780 A1* | 6/2011 | Bollea | H04B 7/0617 370/252 |
| 2012/0082192 A1 | 4/2012 | Pelletier et al. | |

OTHER PUBLICATIONS

"3rd Generation Partnership Project (3GPP); Technical Specification Group Radio Access Network Physical layer procedures (FDD) (3G TS 25.214 version 3.0.0)", 3GPP Standard; 3G TS 25 214 3rd Generation Partnership Project (3GPP), Mobile Competence Centre; 650, Route Des Lucioles; F-06921 Sophia-Antipolis Cedex; France, No. V3.0.0, Oct. 21, 1999 (Oct. 21, 1999), pp. 1-39, XP050400168.
Partial International Search Report—PCT/US2014/041851—ISA/ EPO—Sep. 18, 2014.

* cited by examiner

DEVICES AND METHODS FOR FACILITATING SIGNAL-TO-INTERFERENCE RATIO ESTIMATES FOR CLOSED-LOOP TRANSMISSION DIVERSITY COMMUNICATIONS

CLAIM OF PRIORITY UNDER 35 U.S.C. §119

The present Application for Patent claims priority to Provisional Application No. 61/836,824 entitled "SIR Estimate for CLTD Before DL/UL Synchronization is Achieved" filed Jun. 19, 2013, and assigned to the assignee hereof and hereby expressly incorporated by reference herein.

TECHNICAL FIELD

The technology discussed below relates generally to wireless communications, and more specifically to methods and devices for facilitating signal-to-interference ratio estimates in closed-loop transmission diversity communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate signal-to-interference ratio estimates in closed-loop transmission diversity communications before downlink and uplink synchronization is achieved. According to one or more aspects of the disclosure, UEs may include a communications interface coupled with a processing circuit. The processing circuit may be adapted to receive a transmission via the communications interface, wherein the transmission is sent using transmission diversity. The processing circuit may further be adapted to calculate a plurality of signal-to-interference ratio estimates for the received transmission, wherein each signal-to-interference ratio estimate is calculated using a different weight factor. From among the plurality of signal-to-interference ratio estimates, the processing circuit may be adapted to select a signal-to-interference ratio estimate to be employed for the received transmission.

One or more further aspects of the disclosure provide methods operational on a UE and/or UEs including means for performing such methods. According to one or more examples, such methods may include receiving a transmission sent using transmission diversity. A plurality of signal-to-interference ratio estimates for the received transmission may be calculated, where each signal-to-interference ratio estimate is calculated using a different weight factor. A signal-to-interference ratio estimate may be selected from among the plurality of signal-to-interference ratio estimates to be employed as the signal-to-interference ratio estimate for the received transmission.

Yet further aspects of the present disclosure provide processor-readable mediums including programming executable by a processing circuit. According to one or more examples, such programming may be adapted for causing a processing circuit to obtain a transmission sent using transmission diversity, and calculate a plurality of signal-to-interference ratio estimates for the received transmission, where each signal-to-interference ratio estimate is calculated using a different weight factor. The programming may further be adapted for causing a processing circuit to select, from among the plurality of signal-to-interference ratio estimates, a signal-to-interference ratio estimate to be employed as the signal-to-interference ratio estimate for the received transmission.

According to one or more additional aspects of the disclosure, UEs may include a communications interface coupled with a processing circuit, where the processing circuit may be adapted to receive a transmission via the communications interface sent using transmission diversity. The processing circuit may further be adapted to calculate a signal-to-interference ratio estimate for the received transmission without employing a weight factor, and transmit, via the communications interface, feedback information based on the calculated signal-to-interference ratio estimate.

One or more further aspects of the disclosure provide methods operational on a UE and/or UEs including means for performing such methods. According to one or more examples, such methods may include receiving a transmission sent using transmission diversity, and calculating a signal-to-interference ratio estimate for the received transmission without employing a weight factor. Feedback information may be sent based on the calculated signal-to-interference ratio estimate.

Still further aspects of the present disclosure provide processor-readable mediums including programming executable by a processing circuit. According to one or more examples, such programming may be adapted for causing a processing circuit to obtain a transmission sent using transmission diversity, and calculate a signal-to-interference ratio estimate for the received transmission without employing a weight factor. The programming may further be adapted for causing a processing circuit to transmit feedback information based on the calculated signal-to-interference ratio estimate.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for UMTS and 3rd Generation Partnership Project (3GPP) protocols and systems, and related terminology may be found in much of the following description. However, those of ordinary skill in the art will recognize that one or more aspects of the present disclosure may be employed and included across a broad variety of telecommunication systems, network architectures, and communication standards.

Figure 1:
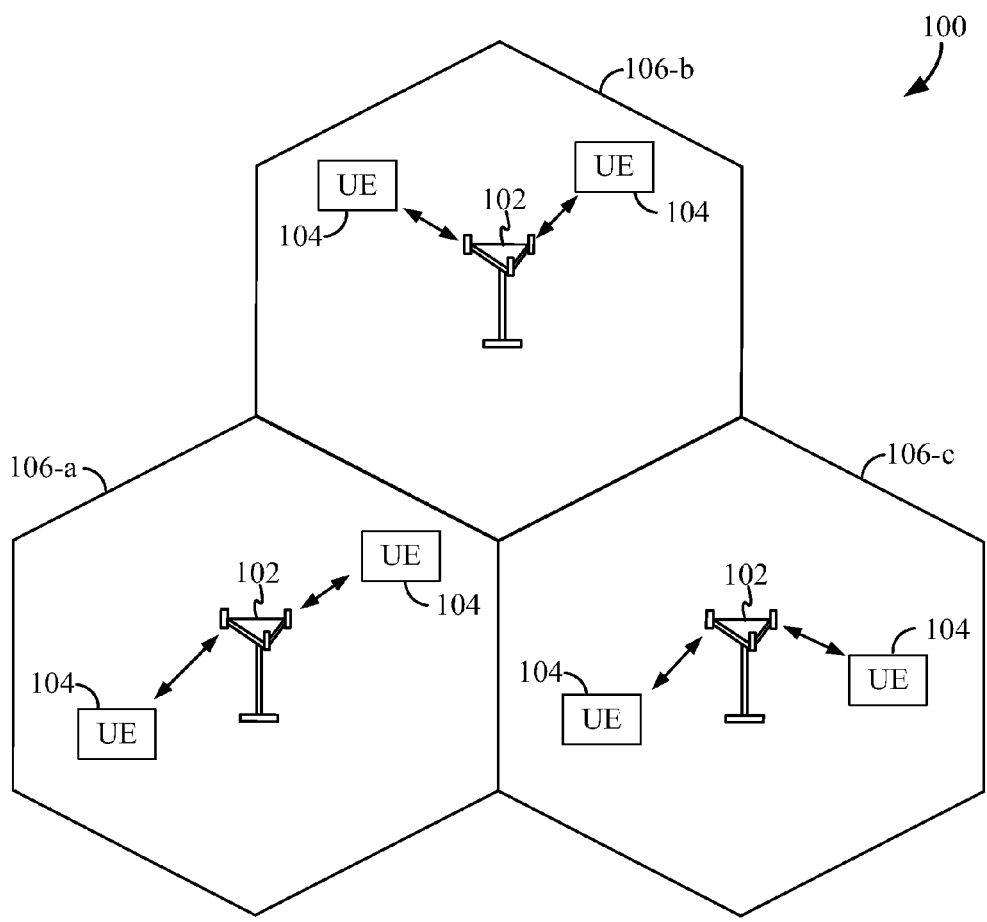
FIG. 1 is a conceptual diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and user equipments (UEs) 104. The base stations 102 and UEs 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the UEs 104 via a base station antenna. The base stations 102 may each be implemented generally as a device adapted to facilitate wireless connectivity (for one or more UEs 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
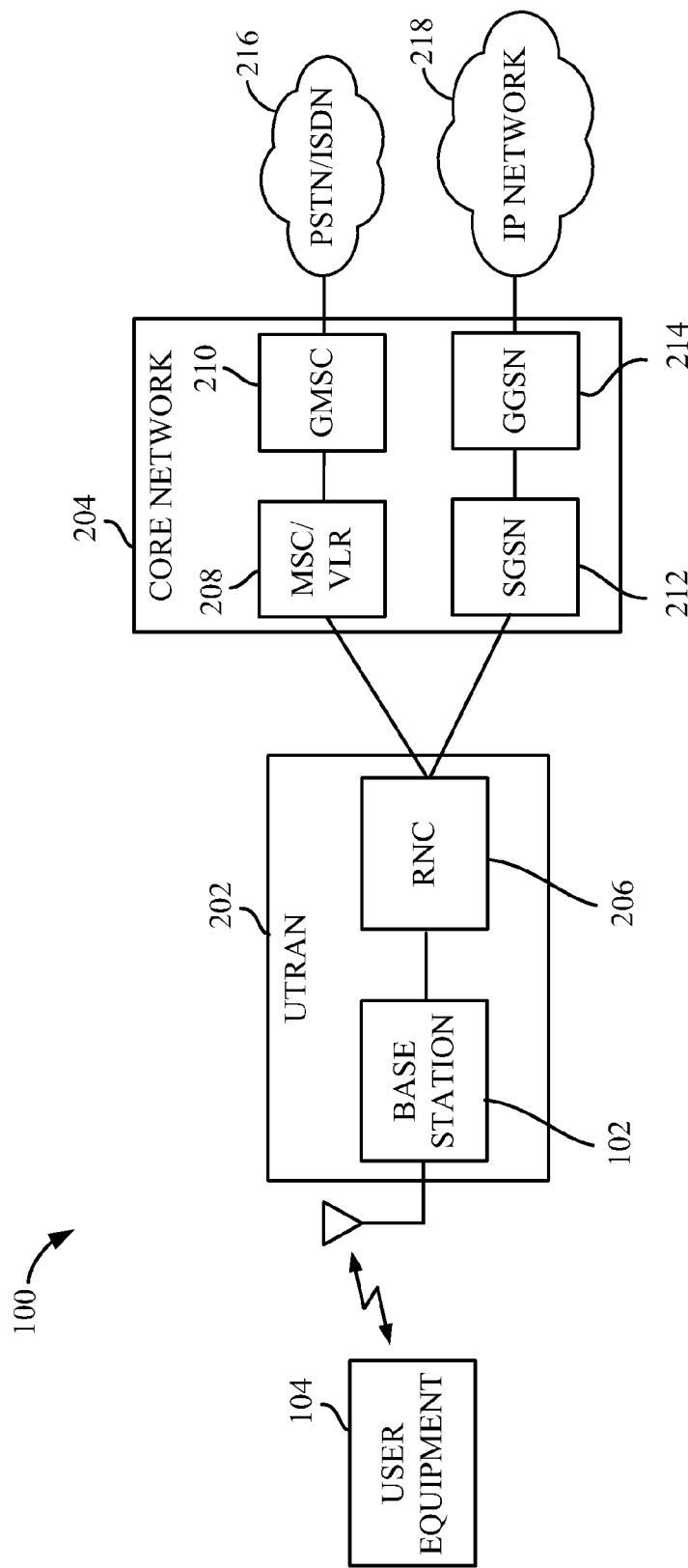
FIG. 2 is a block diagram illustrating select components of the wireless communication system of FIG. 1 according to at least one example.

The base stations 102 are configured to communicate with the UEs 104 under the control of a base station controller (see FIG. 2). Each of the base station 102 sites can provide communication coverage for a respective geographic area. The coverage area 106 for each base station 102 here is identified as cells 106A, 106B, or 106C. The coverage area 106 for a base station 102 may be divided into sectors (not shown, but making up only a portion of the coverage area). In various examples, the system 100 may include base stations 102 of different types.

One or more UEs 104 may be dispersed throughout the coverage areas 106. Each UE 104 may communicate with one or more base stations 102. A UE 104 may generally include one or more devices that communicate with one or more other devices through wireless signals. Such a UE 104 may also be referred to by those skilled in the art as an access terminal, a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. A UE 104 may include a mobile terminal and/or an at least substantially fixed terminal Examples of a UE 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, router, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN), such as a UMTS Terrestrial Radio Access Network (UTRAN) 202. The UTRAN 202 is generally adapted to manage traffic and signaling between one or more UEs 104 and one or more other network entities, such as network entities included in a core network 204. A radio access network may, according to various implementations, be also implemented as a base station subsystem (BSS), an access network, a GSM Edge Radio Access Network (GERAN), etc.

In addition to one or more base stations 102, the UTRAN 202 can include a radio network controller (RNC) 206, which may also be referred to by those of skill in the art as a base station controller (BSC). The radio network controller 206 is generally responsible for the establishment, release, and maintenance of wireless connections within one or more coverage areas associated with the one or more base stations 102 which are connected to the radio network controller 206. The radio network controller 206 can be communicatively coupled to one or more nodes or entities of the core network 204.

The core network 204 is a portion of the wireless communications system 100 that provides various services to UEs 104 that are connected via the UTRAN 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. A UE 104 can obtain access to a public switched telephone network (PSTN) 216 via the circuit-switched domain, and to an IP network 218 via the packet-switched domain.

As base stations 102 communicate with UEs 104 within the wireless communications system 100, closed-loop transmission diversity (CLTD) may be used to improve RF performance. Closed-loop transmission diversity (CLTD) is defined in the 3GPP standards in document TS 25.214, and generally involves a transmitter employing more than one transmit antenna (typically two, where the second antenna is called a diversity antenna) to transmit a signal.

To assist the transmitter in choosing a transmission format, such as a weight factor (corresponding to a phase adjustment) to apply on the diversity antenna, the receiver provides explicit feedback information to the transmitter about the spatial channel. Before the first feedback information is received by the transmitter from the receiver, the transmitter is typically configured to use a default initial weight factor for the diversity antenna. For example, in the 3GPP standards document TS 25.214, an initial weight of $w2=\frac{1}{2}(1+j)$ is to be used by a UTRAN 202 before the first feedback information is received. This means that before a synchronization is established between the downlink (i.e., from the UTRAN 202 to the UE 104) and the uplink (i.e., from the UE 104 to the UTRAN 202), both the UE 104 and the UTRAN 202 are expected to use the same default weight factor.

In some instances, use of the default weight factor has been determined to create problems to the downlink signal-to-interference ratio (SIR) estimate. One example of such a problem is when the primary transmit antenna and diversity transmit antenna at the UTRAN 202 have a phase difference of about 135 degrees. When the phase difference is about 135 degrees, application of the default weight factor causes the resulting phase difference to be about 180 degrees. A 180 degree phase difference can result in signal cancellation when the primary transmit antenna and diversity transmit antenna send the same signal. In such instances, the signal-to-interference ratio (SIR) estimate at the UE 104 receiving the transmission can be very small, and the UE 104 will often fail the synchronization procedure specified in Section 4 of the 3GPP standards document TS 25.214. Generally, an impact is observed most frequently when the phase difference between the signals from the primary antenna and the diversity antenna is between about 90 and 215 degrees.

According to an aspect of the present disclosure, UEs are adapted to calculate the signal-to-interference ratio (SIR) estimate using a plurality of different weights factors for transmissions received prior to downlink and uplink synchronization. From among the plurality of different SIR estimates calculated using the different weights, the UE can select the weight factor that provides the maximum calculated SIR estimate for use in providing feedback information to be employed in the weight mapping at the diversity transmit antenna of the transmitter. In this manner, the UE can work around the possible deconstructive effect of the default initial weight factor.

According to further aspects of the present disclosure, UEs are adapted to calculate the signal-to-interference ratio (SIR) estimate for a transmission received prior to downlink and uplink synchronization without using any weight factors. The UE can simply calculate the signal-to-interference ratio (SIR) estimate based on the signal power from each branch without using any weight factor. In this manner, the UE can quickly achieve a better signal-to-interference ratio (SIR) estimate by rapidly sending the downlink transmit power control (DLTPC) commands on the uplink.

Figure 3:
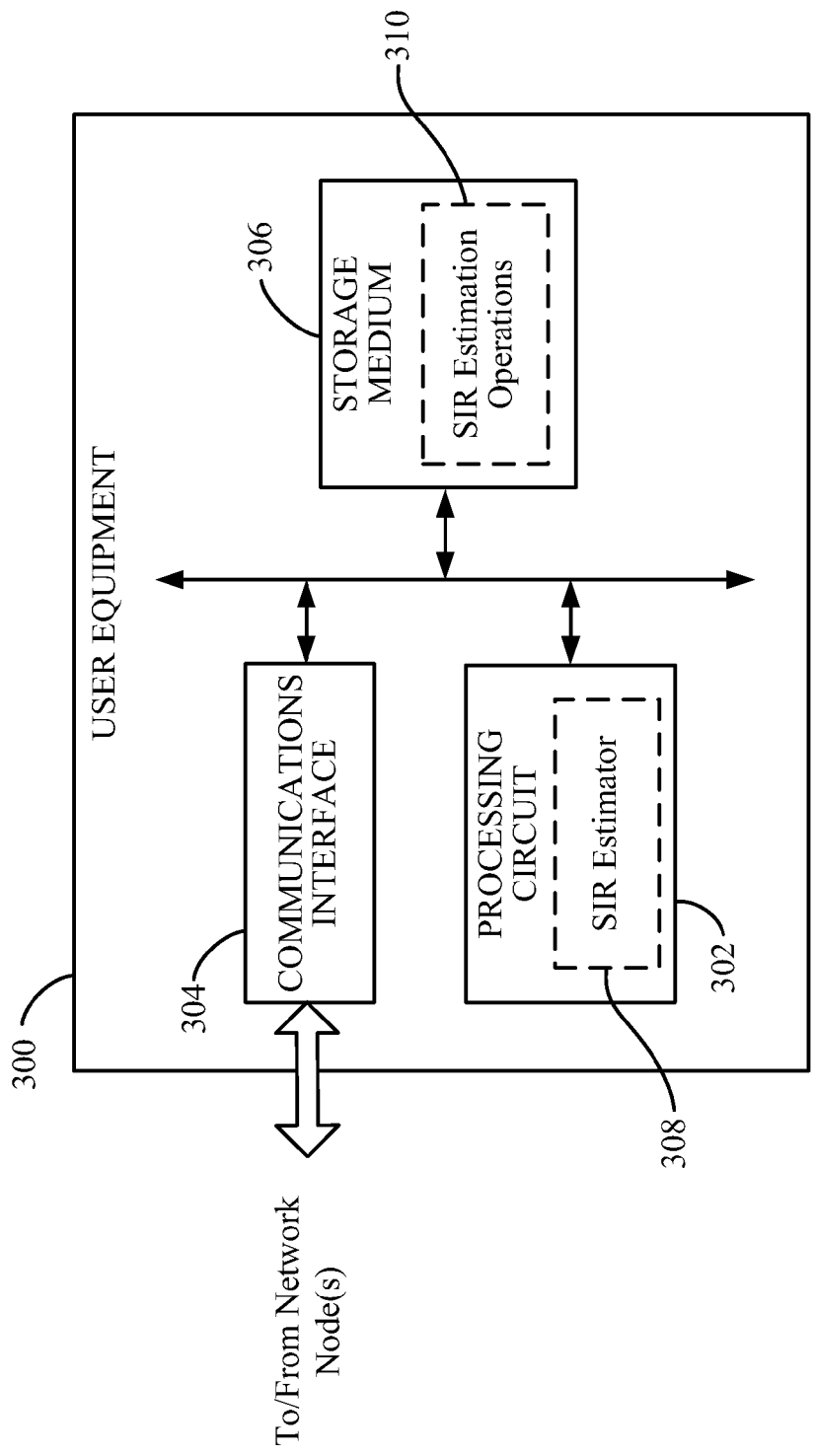
FIG. 3 is a block diagram illustrating select components of a user equipment (UE) according to at least one example.

Turning to FIG. 3, a block diagram is shown illustrating select components of a user equipment 300 according to at least one example of the present disclosure. The UE 300 includes a processing circuit 302 coupled to or placed in electrical communication with a communications interface 304 and a storage medium 306.

The processing circuit 302 is arranged to obtain, process and/or send data, control data access and storage, issue commands, and control other desired operations. The processing circuit 302 may include circuitry adapted to implement desired programming provided by appropriate media, and/or circuitry adapted to implement various functionality described throughout the present disclosure. For example, the processing circuit 302 may be implemented as one or more processors, one or more controllers, and/or other structure configured to execute executable programming Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 302 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 302 are for illustration and other suitable configurations within the scope of the present disclosure are also contemplated.

The processing circuit 302 can be adapted for the execution of programming, which may be stored on the storage medium 306. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 302 may include a signal-to-interference ratio (SIR) estimator 308. The SIR estimator 308 may include circuitry and/or programming (e.g., programming stored on the storage medium 306) adapted to calculate the signal-to-interference ratio (SIR) estimation for received signals that have been transmitted using transmission diversity, and to provide feedback information (e.g., downlink transmit power control (DLTPC) commands) to the transmitting device.

The communications interface 304 is configured to facilitate wireless communications of the UE 300. For example, the communications interface 304 may include circuitry and/or programming adapted to facilitate the communication of information bi-directionally with respect to one or more wireless network devices (e.g., network nodes). The communications interface 304 may be coupled to one or more antennas (not shown).

The storage medium 306 may represent one or more processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing and/or carrying programming By way of example and not limitation, the storage medium 306 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the UE 300, external to the UE 300, distributed across multiple entities).

Programming stored by the storage medium 306, when executed by the processing circuit 302, causes the processing circuit 302 to perform one or more of the various functions and/or process steps described herein. In at least some examples, the storage medium 306 may include signal-to-interference ratio (SIR) estimation operations 310 adapted to cause the processing circuit 302 to calculate a signal-to-interference ratio (SIR) estimate prior to uplink and downlink synchronization, as described herein. Thus, according to one or more aspects of the present disclosure, the processing circuit 302 is adapted to perform (in conjunction with the storage medium 306) any or all of the processes, functions, steps and/or routines for any or all of the UEs described herein (e.g., UE 104, UE 300). As used herein, the term "adapted" in relation to the processing circuit 302 may refer to the processing circuit 302 being one or more of configured, employed, implemented, and/or programmed (in conjunction with the storage medium 306) to perform a particular process, function, step and/or routine according to various features described herein.

Figure 4:
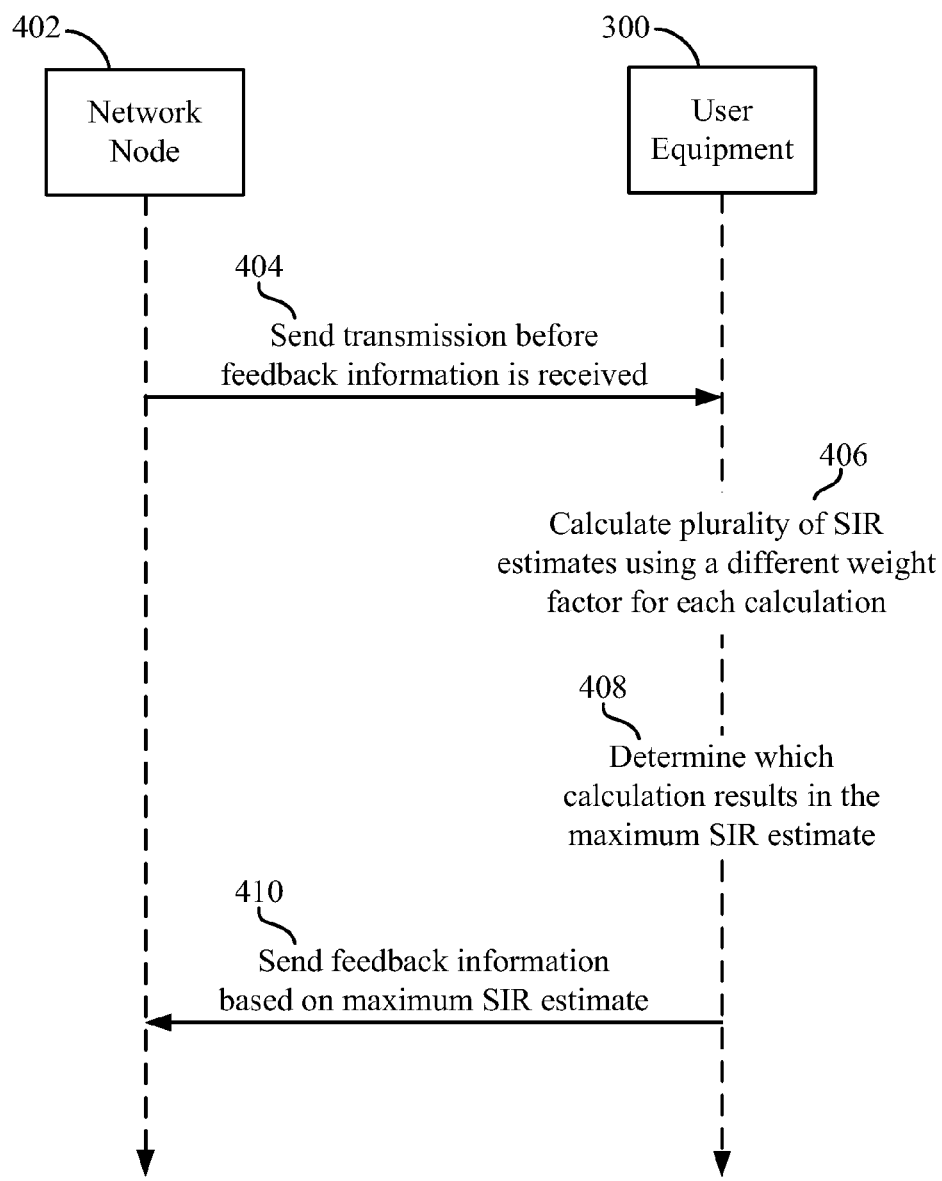
FIG. 4 is a conceptual flow diagram illustrating an example for obtaining a signal-to-interference ration (SIR) estimate using a plurality of different weight factors.

In operation, the UE 300 may calculate a plurality of signal-to-interference ratio (SIR) estimates for a transmission received prior to downlink and uplink synchronization using a plurality of different weights. FIG. 4 is a conceptual flow diagram illustrating an example for obtaining a signal-to-interference ration (SIR) estimate using a plurality of weight factors. A network node 402 (e.g., a base state 102 in the UTRAN 202 in FIG. 2) may initially send a downlink transmission 404 to a user equipment (UE) 300 using a plurality of transmission antennas for closed-loop transmission diversity (CLTD). For example, the downlink transmission 404 may be sent on a dedicated physical channel (DPCH) using a primary transmit antenna and a diversity transmit antenna. In at least one example, the transmission 404 may comprise a dedicated pilot transmission, although any part of the dedicated physical channel (DPCH) may be employed.

The downlink transmission 404 is sent before any feedback information has been received by the network node 402 from the UE 300 for use in determining a weight factor to be applied. Accordingly, the network node 402 can apply a default initial weight factor to the transmission on the one or more diversity antennas. According to one example, the network node 402 can apply the default initial weight factor to the diversity antenna of w2=½(1+j) (e.g., an initial weight factor of 45 degrees).

The UE 300 receives the transmission 404 and calculates a plurality of signal-to-interference ratio (SIR) estimates 406, where each signal-to-interference ratio (SIR) estimate is based on a different respective weight factor. In at least one example, the UE 300 may use four different weight factors of 45 degrees, 135 degrees, −45 degrees, and −135 degrees.

Based on the plurality of signal-to-interference ratio (SIR) estimates, the UE 300 can determine which calculation provides the maximum signal-to-interference ratio (SIR) estimate at 408. The UE 300 can then send feedback information 410 to the network 402 based on the maximum signal-to-interference ratio (SIR) estimate.

Figure 5:
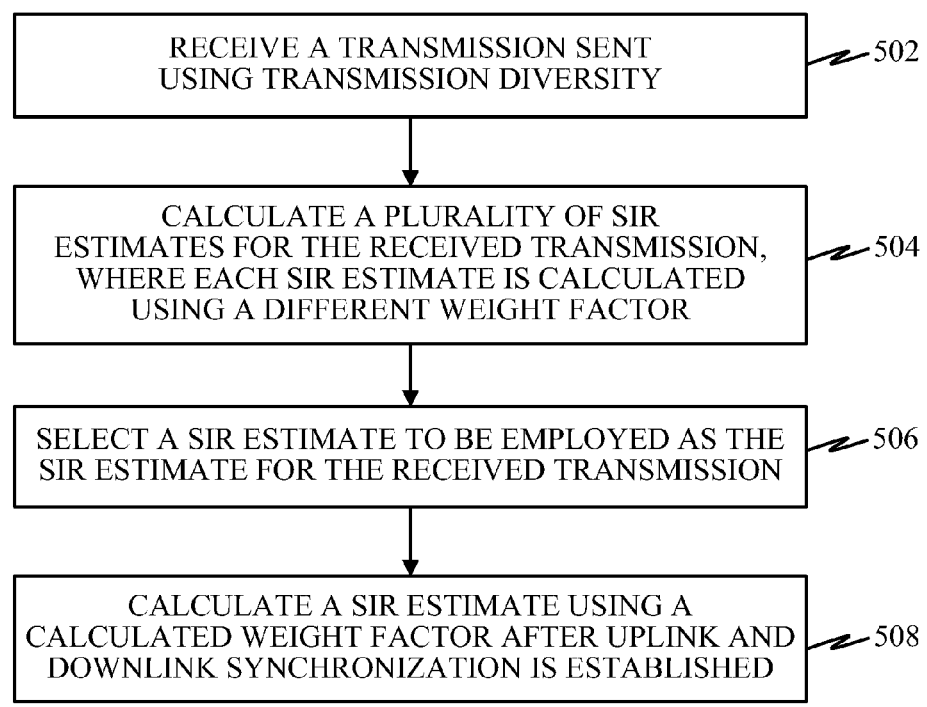
FIG. 5 is a flow diagram illustrating a method operational on a UE according to at least one example.

FIG. 5 is a flow diagram illustrating at least one example of a method operational on a UE, such as the UE 300. Referring to FIGS. 3 and 5, a UE 300 can receive a transmission that has been sent using transmission diversity, at 502. For example, the processing circuit 302 may receive a downlink transmission via the communications interface 304. The downlink transmission can include signals sent by a plurality of different transmit antennas to facilitate transmission diversity. For instance, the downlink transmission may include a first signal sent by a primary transmit antenna and a second signal sent by a diversity transmit antenna. The downlink transmission may be sent using a default initial weight factor for the transmission diversity. The downlink transmission may be transmitted before downlink and uplink synchronization has occurred between the UE 300 and the transmitting device.

At 504, the UE 300 can calculate a plurality of signal-to-interference ratio (SIR) estimates, where each signal-to-interference ratio (SIR) estimate is calculated using a different weight factor. For example, the processing circuit 302 (e.g., the signal-to-interference ratio (SIR) estimator 308) executing the signal-to-interference ratio (SIR) estimation operations 310 may calculate the plurality of signal-to-interference ratio (SIR) estimates using different weight factors for each calculation. The signal-to-interference ratio (SIR) estimates, in at least one example, can be calculated using weight factors selected from a group of weight factors including 45 degrees, 135 degrees, negative 45 (−45) degrees, and negative 135 (−135) degrees. In at least one example, the processing circuit 302 (e.g., the signal-to-interference ratio (SIR) estimator 308) executing the signal-to-interference ratio (SIR) estimation operations 310 may calculate a first signal-to-interference ratio (SIR) estimate using a weight factor of 45 degrees, a second signal-to-interference ratio (SIR) estimate using a weight factor of 135 degrees, a third signal-to-interference ratio (SIR) estimate using a weight factor of negative 45 (−45) degrees, and a fourth signal-to-interference ratio (SIR) estimate using a weight factor of negative 135 (−135) degrees.

At 506, the UE 300 can select a signal-to-interference ratio (SIR) estimate to be employed as the signal-to-interference ratio (SIR) estimate for the received transmission. For example, the processing circuit 302 (e.g., the signal-to-interference ratio (SIR) estimator 308) executing the signal-to-interference ratio (SIR) estimation operations 310 may select, from among the plurality of calculated signal-to-interference ratio (SIR) estimates, a signal-to-interference ratio (SIR) estimate to be used for the received transmission. In at least one example, the processing circuit 302 (e.g., the signal-to-interference ratio (SIR) estimator 308) executing the signal-to-interference ratio (SIR) estimation operations 310 may compare all of the plurality of signal-to-interference ratio (SIR) estimates, and may identify the signal-to-interference ratio (SIR) estimate with the highest value. That signal-to-interference ratio (SIR) estimate with the highest value can then be selected for use as the signal-to-interference ratio (SIR) estimate for the received transmission. In at least one example, the processing circuit 302 (e.g., the signal-to-interference ratio (SIR) estimator 308) executing the signal-to-interference ratio (SIR) estimation operations 310 may transmit feedback information based on the selected signal-to-interference ratio (SIR) estimate.

The foregoing operations can be employed by the UE 300 for transmissions received before uplink and downlink synchronization (e.g., as described in Section 4 of the 3GPP standards document TS 25.214) has been established. At 508, after the uplink and downlink synchronization is established, the UE 300 can employ conventional means for calculating the signal-to-interference ratio (SIR) estimates based on a calculated weight factor, such as that described in the 3GPP standards document TS 25.214.

Figure 6:
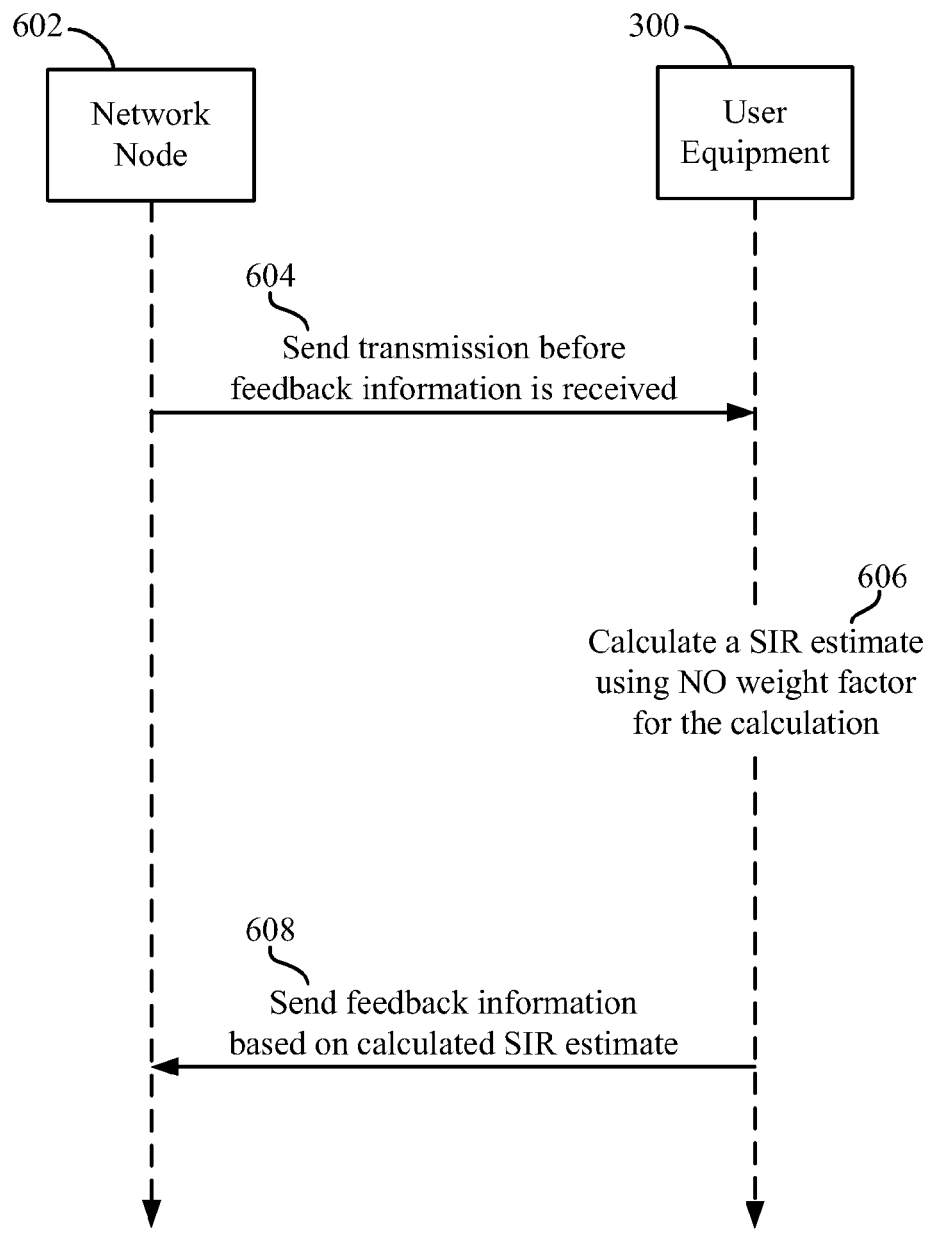
FIG. 6 is a conceptual flow diagram illustrating an example for obtaining a signal-to-interference ration (SIR) estimate using no weight factor.

In other examples of the present disclosure, the UE 300 may calculate a signal-to-interference ratio (SIR) estimate for a transmission received prior to downlink and uplink synchronization without using any weight factor for the diversity signal. FIG. 6 is a conceptual flow diagram illustrating an example for obtaining a signal-to-interference ration (SIR) estimate using no weight factor. A network node 602 (e.g., a base state 102 in the UTRAN 202 in FIG. 2) may initially send a downlink transmission 604 to a user equipment (UE) 300 using a plurality of transmission antennas for closed-loop transmission diversity (CLTD). For example, the downlink transmission 604 may be sent on a dedicated physical channel (DPCH) using a primary transmit antenna and a diversity transmit antenna. In at least one example, the transmission 604 may comprise a dedicated pilot transmission, although any part of the dedicated physical channel (DPCH) may be employed.

The downlink transmission 604 is sent before any feedback information has been received by the network node 602 from the UE 300 for use in determining a weight factor to be applied on the one or more diversity antennas. Accordingly, the network node 602 can apply a default initial weight factor to the transmission on the one or more diversity antennas. In one example, the network node 602 can apply the default initial weight factor to the diversity antenna of w2=½(1+j) (e.g., an initial weight factor of 45 degrees).

The UE 300 receives the transmission 604 and calculates a signal-to-interference ratio (SIR) estimate 606. In this example, the signal-to-interference ratio (SIR) estimate is calculated without use of any weight factor. That is, the signal-to-interference ratio (SIR) estimate can be calculated by combining the signal power from each branch without using any weight factor. The UE 300 can then send feedback information 608 to the network 602 based on the signal-to-interference ratio (SIR) estimate calculated without employing any weight factor.

Figure 7:
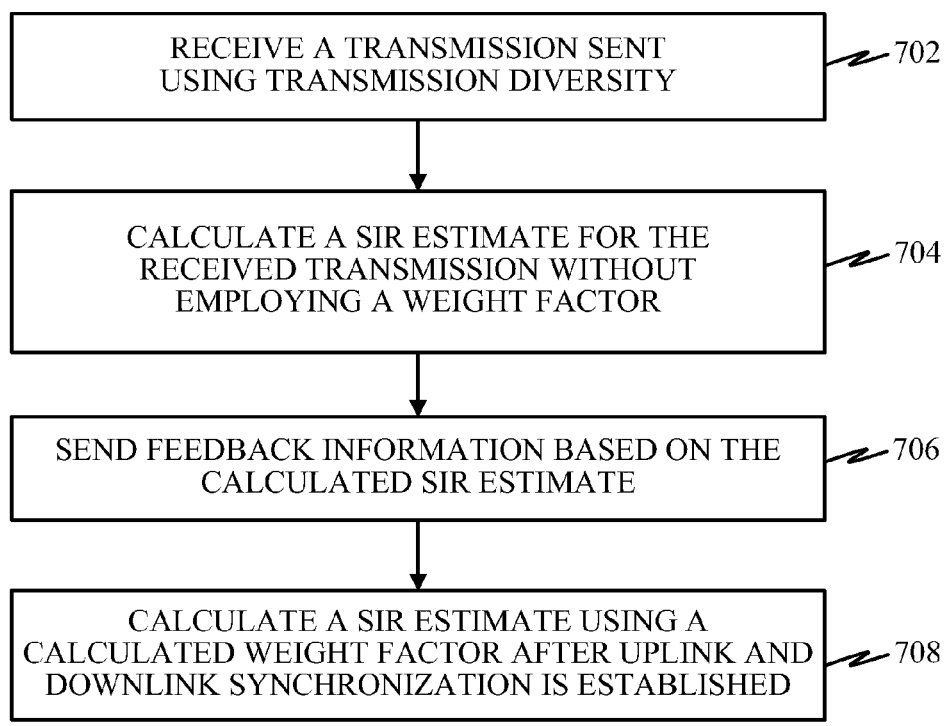
FIG. 7 is a flow diagram illustrating another method operational on a UE according to at least one example.

FIG. 7 is a flow diagram illustrating another example of a method operational on a UE, such as the UE 300. Referring to FIGS. 3 and 7, a UE 300 can receive a transmission that has been sent using transmission diversity, at 702. For example, the processing circuit 302 may receive a downlink transmission via the communications interface 304. The downlink transmission can include signals sent by a plurality of different transmit antennas to facilitate transmission diversity. For instance, the downlink transmission may include a first signal sent by a primary transmit antenna and a second signal sent by a diversity transmit antenna. The downlink transmission may be sent using a default initial weight factor for the transmission diversity. The downlink transmission may be transmitted before downlink and uplink synchronization has occurred between the UE 300 and the transmitting device.

At 704, the UE 300 can calculate a signal-to-interference ratio (SIR) estimate for the received transmission without employing any weight factor. For example, the processing circuit 302 (e.g., the signal-to-interference ratio (SIR) estimator 308) executing the signal-to-interference ratio (SIR) estimation operations 310 can calculate the signal-to-interference ratio (SIR) estimate based on the signal power from each branch of the received transmission without using any weight factor. That is, instead of employing a default initial weight factor, or any other weight factor, the processing circuit 302 (e.g., the signal-to-interference ratio (SIR) estimator 308) executing the signal-to-interference ratio (SIR) estimation operations 310 can simply combine the signal power from a primary transmit antenna and a diversity transmit antenna without using any weight information.

At 706, the UE 300 can send feedback information based on the signal-to-interference ratio (SIR) estimate calculated without any weight factor. For example, the processing circuit 302 (e.g., the signal-to-interference ratio (SIR) estimator 308) executing the signal-to-interference ratio (SIR) estimation operations 310 can transmit a feedback signaling message based on the signal-to-interference ration (SIR) estimate calculated without any weight factor.

The foregoing operations can be employed by the UE 300 for transmissions received before uplink and downlink synchronization (e.g., as described in Section 4 of the 3GPP standards document TS 25.214) has been established. At 508, after the uplink and downlink synchronization is established, the UE 300 can employ conventional means for calculating the signal-to-interference ratio (SIR) estimates based on a calculated weight factor, such as that described in the 3GPP standards document TS 25.214.

By implementing one or more of the features described herein, a UE can avoid instances where a default initial weight factor can result in cancellation of the transmission diversity signals, and failure to complete uplink and downlink synchronization.

While the above discussed aspects, arrangements, and embodiments are discussed with specific details and particularity, one or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, and/or 3 may be configured to perform or employ one or more of the methods, features, parameters, and/or steps described in FIGS. 4, 5, 6, and/or 7. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A user equipment, comprising:
a communications interface; and
a processing circuit coupled to the communications interface, the processing circuit adapted to:
    receive a transmission via the communications interface, wherein the transmission is sent using transmission diversity, and wherein the transmission is received prior to completing uplink and downlink synchronization with a device from which the transmission was sent;
    calculate a plurality of signal-to-interference ratio estimates for the received transmission, wherein each signal-to-interference ratio estimate is calculated using a different weight factor; and
    select, from among the plurality of signal-to-interference ratio estimates, a signal-to-interference ratio estimate to be employed for the received transmission.

2. The user equipment of claim 1, wherein the processing circuit is adapted to:
calculate the plurality of signal-to-interference ratio estimates for the received transmission, wherein each signal-to-interference ratio estimate is calculated using a different weight factor selected from a group of weight factors comprising 45 degrees, 135 degrees, negative 45 degrees, and negative 135 degrees.

3. The user equipment of claim 1, wherein the processing circuit adapted to calculate the plurality of signal-to-interference ratio estimates for the received transmission comprises the processing circuit adapted to:
calculate a first signal-to-interference ratio estimate using a weight factor of 45 degrees;
calculate a second signal-to-interference ratio estimate using a weight factor of 135 degrees;
calculate a third signal-to-interference ratio estimate using a weight factor of negative 45 degrees; and
calculate a fourth signal-to-interference ratio estimate using a weight factor of negative 135 degrees.

4. The user equipment of claim 1, wherein the processing circuit is adapted to select the signal-to-interference ratio estimate with the highest value to be employed for the received transmission.

5. The user equipment of claim 1, wherein the processing circuit is further adapted to:
transmit, via the communications interface, feedback information based on the selected signal-to-interference ratio estimate.

6. The user equipment of claim 1, wherein the processing circuit is further adapted to:
calculate a signal-to-interference ratio estimate for subsequently received transmissions using a calculated weight factor.

7. The user equipment of claim 1, wherein the received transmission employs a default initial weight factor for the transmission diversity.

8. A method operational on a user equipment, comprising:
receiving a transmission sent using transmission diversity prior to completing uplink and downlink synchronization with a device from which the transmission was sent;
calculating a plurality of signal-to-interference ratio estimates for the received transmission, wherein each signal-to-interference ratio estimate is calculated using a different weight factor; and
selecting, from among the plurality of signal-to-interference ratio estimates, a signal-to-interference ratio estimate to be employed as the signal-to-interference ratio estimate for the received transmission.

9. The method of claim 8, wherein receiving a transmission sent using transmission diversity comprises:
receiving a transmission employing a default initial weight factor for the transmission diversity.

10. The method of claim 8, wherein calculating the plurality of signal-to-interference ratio estimates for the received transmission comprises:
calculating the plurality of signal-to-interference ratio estimates for the received transmission using weight factors selected from a group of weight factors comprising 45 degrees, 135 degrees, negative 45 degrees, and negative 135 degrees.

11. The method of claim 8, wherein calculating the plurality of signal-to-interference ratio estimates for the received transmission comprises:
calculating a first signal-to-interference ratio estimate using a weight factor of 45 degrees;
calculating a second signal-to-interference ratio estimate using a weight factor of 135 degrees;
calculating a third signal-to-interference ratio estimate using a weight factor of negative 45 degrees; and
calculating a fourth signal-to-interference ratio estimate using a weight factor of negative 135 degrees.

12. The method of claim 8, wherein selecting, from among the plurality of signal-to-interference ratio estimates, the signal-to-interference ratio estimate to be employed as the signal-to-interference ratio estimate for the received transmission comprises:
selecting, from among the plurality of signal-to-interference ratio estimates, a signal-to-interference ratio estimate with a highest value to be employed as the signal-to-interference ratio estimate for the received transmission.

13. The method of claim 8, further comprising:
sending feedback information based on the selected signal-to-interference ratio estimate.

14. The method of claim 8, further comprising:
calculating a signal-to-interference ratio estimate for a subsequent received transmission using a calculated weight factor.

15. A user equipment, comprising:
a communications interface; and
a processing circuit coupled to the communications interface, the processing circuit adapted to:
receive a transmission via the communications interface, wherein the transmission has been sent using transmission diversity;
calculate a signal-to-interference ratio estimate for the received transmission without employing a weight factor; and
transmit, via the communications interface, feedback information based on the calculated signal-to-interference ratio estimate.

16. The user equipment of claim 15, wherein the received transmission employs a default initial weight factor for the transmission diversity.

17. The user equipment of claim 15, wherein the transmission is received prior to completing uplink and downlink synchronization with a device from which the transmission was sent.

18. The user equipment of claim 15, wherein the processing circuit is further adapted to:
calculate a signal-to-interference ratio estimate for subsequently received transmissions using a calculated weight factor.

19. A method operational on a user equipment, comprising:
receiving a transmission sent using transmission diversity;
calculating a signal-to-interference ratio estimate for the received transmission without employing a weight factor; and
transmitting feedback information based on the calculated signal-to-interference ratio estimate.

20. The method of claim 19, wherein receiving a transmission sent using transmission diversity comprises:
receiving a transmission employing a default initial weight factor for the transmission diversity.

21. The method of claim 19, wherein receiving a transmission sent using transmission diversity comprises:
receiving the transmission prior to completing uplink and downlink synchronization with a device from which the transmission was sent.

22. The method of claim 19, further comprising:
calculating a signal-to-interference ratio estimate for a subsequent received transmission using a calculated weight factor.

* * * * *